3,145,466

DIFFUSION BONDING OF METAL MEMBERS

William Feduska, Emsworth, Pa., assignor to Westinghouse Electric Corporation, East Pittsburgh, Pa., a corporation of Pennsylvania No Drawing. Filed Nov. 27, 1959, Ser. No. 855,530
4 Claims. (Cl. 29—488)

This invention is directed to a method of diffusion bonding high temperature alloy members, and to structural elements formed thereby.

High temperature alloys are at present generally brazed with relatively low melting, nickel-base brazing alloys. These nickel-base brazing alloys which melt within the range of 1000° C. to 1200° C. usually contain chromium, silicon, boron, carbon, and iron as addition elements. Although these alloys perform satisfactorily in numerous brazing applications, they do have certain disadvantages. For example, these commercial high temperature brazing alloys are inherently hard and brittle and the joints brazed with these alloys tend to exhibit these same properties. It is also true, that boron, which, as indicated, is present in some of these alloys, is capable of diffusion along the grain boundaries of austenitic type alloys where it reacts to form a boride grain boundary network. This boride network is hard and brittle, and may lead to failure of the brazed joint when it is subjected to dynamic stresses during high temperature service.

It is manifest that if a high temperature alloy joint could be produced without introducing the undesirable elements present in currently available commercial brazing alloys, at least some of the objectionable features of high temperature alloy brazing could be avoided. This disclosure is concerned with the application of the diffusion bonding technique in the field of joining high temperature alloys.

Accordingly, it is a primary object of this invention to provide a method for producing a strong, ductile bond between high temperature alloy base members by diffusion of beryllium from the interface region into the base metal.

It is another object of this invention to provide high temperature alloy structural members joined together, the joints having a composition essentially that of the base metal alloy with small amounts of beryllium added thereto, and characterized by grain growth across the interface.

Other objects of the invention will, in part, be obvious and will, in part, appear hereinafter.

In accordance with the present invention and attainment of the foregoing objects, there is provided a method for joining alloy members into a structure suitable for use at elevated temperatures, which broadly comprises the steps of, (1) polishing or otherwise shaping to close conformity the faying surfaces of the members to be joined, (the surfaces being clean), (2) providing a thin continuous layer of beryllium on at least one of the faying surfaces, (3) positioning the members in sandwich fashion with the faying surfaces in contacting face-to-face relation with the beryllium layer disposed between them, and (4) heating the members to a temperature of at least 1000° C. for a predetermined period of time to promote a diffusion reaction.

This method may be employed with high temperature alloys, and particularly with stainless steels of martensitic or austenitic structure.

The diffusion bonding technique of this invention involves preplacing diffusible beryllium material on one or both faying surfaces of the base metal members which are to be joined. With the faying faces properly aligned and in intimate contact, the assembly is heated in an oxygen free protective environment to a predetermined bonding temperature of at least 1000° C. for a period of at least 20 seconds. At this temperature, the beryllium migrates from the interface region into the base metal. This migration is accompanied by some interdiffusion of base metal elements from each of the members across the interface to produce a bonding joint alloy composition which approaches the base metal alloy composition.

Using the general technique outlined above, but with some details of the process differing in accordance with the experience gained, the following examples illustrate how joints of each of two high temperature alloys having widely differing compositions have been made by diffusion bonding.

EXAMPLE I

A diffusion "sandwich-specimen" of AISI 410 martensitic stainless steel (composition; 11.5% to 13.5% chromium, 0.15% max. carbon, and the balance essentially iron) was prepared from two ¾ inch square by ⅛ inch thick pieces. The faying faces were polished to 400 grit metallographic paper finish so that the surfaces closely conformed to each other and the pieces were then thoroughly degreased. A slurry composed of beryllium powder having a particle size of −325 mesh in a volatilizable carrying vehicle composed of a thermoplastic compound in an organic solvent, was thinly painted (thickness from .0005 to .002 inch) over the polished face of one plate. The carrier vehicle was a liquid low polymer of acrylic acid. Other liquid-alkyl acrylic resin low polymers are equally suitable. The top polished face was placed over the painted face and the "sandwich" was subjected to 30,000 pounds compressive load. The compressive load was used to insure intimate interface contact between, the faying faces. Following this operation the sandwich specimen was placed within a Vycor tube and an induction coil was positioned around the specimen. The Vycor tube was sealed off and the system was evacuated to about 0.07 micron absolute pressure. In this vacuum environment, the sample was heated to 1300° C., held at this temperature for one minute and cooled in vacuum to room temperature. The carrying vehicle was completely volatilized and driven off by this treatment. The sample was sectioned across the interface to determine both the soundness and the nature of the diffusion bonded joint. The interface region was then polished and etched with Fry's etch and examined under the microscope at a magnification of 100. Beryllium diffusion into the base metal was detected by an acicular grain structure lying generally parallel to the interface but at some distance therefrom in the base metal. It was also observed that grain growth occurred across the original interface, and comprised a single solid solution phase.

EXAMPLE II

A diffusion "sandwich specimen" of a high temperature austenitic ferrous-base alloy hereinafter designated as alloy D, was prepared by a process differing somewhat from that of Example I. Alloy D has the following composition:

| | Weight percent |
|---|---|
| Nickel | 26.0 |
| Chromium | 13.5 |
| Molybdenum | 2.75 |
| Titanium | 1.75 |
| Manganese | 0.9 |
| Silicon | 0.8 |
| Aluminum | 0.1 |
| Carbon | 0.04 |
| Iron | Balance |

The faying faces of two alloy D members to be joined by a lap joint were polished and degreased as in Example I. One faying surface was then coated with vapor deposited beryllium. This was done by vaporizing pure beryllium (99.7% beryllium) in a furnace from a tantalum boat which was positioned 8 inches below the alloy D members. The tantalum boat supporting the beryllium constituted the resistance element of the furnace which was brought to vaporizing temperature by passing electric current therethrough. The vapor deposition process was conducted in vacuum at 0.08 micron and the current was raised to a maximum of 250 amperes. The deposition time was 45 seconds at a temperature of about 1100° C. The thickness of the deposited layer of beryllium was estimated at from 2 to 3 microinches. The alloy D members were then assembled in contacting relation as a single lap joint and then heated in vacuum to 1250° C. and held for one minute at that temperature. The lap joint was then sectioned, polished, and etched in accordance with the procedure used in Example I. When the specimen was observed under a microscope at a magnification of 500 it was noted that the beryllium had diffused from the interface into both legs of the lap joint and had produced a preponderantly solid solution formation at the interface region, with grain growth across the former interface.

After completing the diffusion bonding operation, the alloy D lap joint specimens were tested in shear at room temperature. The shear strength of single lap joints of alloy D, diffusion bonded with beryllium, varied from 13,100 p.s.i. to greater than 16,000 p.s.i. The results of the shear test are summarized in Table I below.

*Table I*

TEST DATA OBTAINED ON ALLOY D SINGLE-LAP JOINTS DIFFUSION-BONDED WITH BERYLLIUM

| Run No. | 1 | 2 | 3 |
|---|---|---|---|
| Breaking Load (lbs.) | 1,740 | 2,275 | 1,328 |
| Brazed Area (in.²) | .1424 | .1418 | .1016 |
| Breaking Stress (p.s.i.) | 12,200 | 16,000 | 13,100 |
| Elong. (in.) | .1785 | .3745 | .1395 |
| Remarks | Broke in parent metal. | Broke in parent metal. | Broke in joint interface. |

Since failure occurred in the base metal when the overlap was set at three times the thickness of the plate, a dimension within design practice, the high strength of these joints is apparent. Because the overlap regions yielded and became inclined to the main specimen axis during the test, it is evident that substantial ductility characterizes these diffusion bonded joints.

When the proper diffusion cycle, i.e., temperature and time at temperature, is employed, small amounts of beryllium preplaced on the faying surfaces will diffuse from the interface into the base metal and react to form the desired solid solution with the base metal elements at the interface, to produce excellent bonded joints.

It will be observed that relatively small amounts of beryllium, a layer of, for example, 1 to 10 microns in the vapor deposition process, are adequate to provide a well-bonded joint. On the other hand, even though bonding occurs when very much larger amounts of beryllium are employed, the excess beryllium present may react with some base metals to which it has been applied to form brittle beryllides which may not be desirable.

Briefly, a method for producing strong, ductile, crack-free joints of high temperature alloy members, which joints are free from undesirable embrittling elements has been presented. Results have been obtained with this process which cannot be secured by conventional brazing techniques.

An application for which the process of this invention is suitable is the fabrication of metallic honeycomb structures. The painting and vapor deposition techniques are convenient for preplacing the diffusible element in these complex structures.

The inventive principles embodied in the above description may obviously be incorporated in modified processes by those skilled in the art without departing from the spirit and scope of this invention, and it is intended that the description be interpreted as illustrative and not limiting.

I claim as my invention:

1. A diffusion bonding process for joining alloy members into a structure suitable for use at elevated temperatures, the faying surfaces of the members to be joined being clean and closely conforming to each other, the steps comprising placing a thin substantially continuous layer of beryllium on at least one of said surfaces, positioning said members in positive engagement for joining with the faying surfaces in intimate face-to-face relation and the beryllium layer therebetween, and heating said members to a temperature of at least 1,000° C. for a period of at least 20 seconds in vacuum, thereby providing a bond having essentially the composition of the alloy members and characterized by grain growth across the interface of the members.

2. A diffusion bonding process for joining alloy members into a structure suitable for use at elevated temperatures, the method comprising the steps of, polishing and degreasing the faying surfaces of the members to be joined, painting at least one of the faying surfaces with a thin continuous coat of a slurry composed of a beryllium powder in a volatilizable carrying vehicle, positioning said members for joining with the faying surfaces in face-to-face relation and the beryllium-containing layer therebetween, exerting a compressive force upon said members to bring them into intimate interface engagement, and heating said members to a temperature of at least 1000° C. for a period of at least 20 seconds in vacuum, thereby volatilizing the carrying vehicle and providing a bond having essentially the composition of the alloy members which is characterized by grain growth across the interface of the members.

3. A diffusion bonding process for joining alloy members into a structure suitable for use at elevated temperatures, the method comprising the steps of, polishing and degreasing the faying surfaces of the members to be joined, painting at least one of the faying surfaces with a thin continuous coat of a slurry composed of a beryllium powder in a volatilizable carrying vehicle, said vehicle comprising a thermoplastic compound in an organic solvelt, positioning said members for joining with the faying surfaces in face-to-face relation and the beryllium-containing layer therebetween, exerting a compressive force upon said members to bring them into intimate interface engagement, and heating said members to a temperature of at least 1000° C. for a period of at least 20 seconds in vacuum, thereby volatilizing the carrying vehicle and providing a bond having essentially the composition of the alloy members which is characterized by a grain growth across the interface of the members.

4. A diffusion bonding process for joining alloy members into a structure suitable for use at elevated temperatures, the method comprising the steps of, polishing and degreasing the faying surfaces of the members to be joined, vapor depositing, in vacuum, a thin contiuous layer of beryllium particles upon one of the faying surfaces, positioning said members in positive engagement for joining with the faying surfaces in face-to-face relation and the beryllium layer therebetween, and heating said members to a temperature of at least 1000° C. for a period of at least 20 seconds in vacuum, thereby providing a bond having essentially the composition of the alloy members and characterized by grain growth across the interface of the members.

References Cited in the file of this patent

UNITED STATES PATENTS 2,397,308 Barnes ---------------- Mar. 26, 1946
2,464,821 Ludwick et al. ----------- Mar. 22, 1949

(Other references on following page)

UNITED STATES PATENTS

| | | |
|---|---|---|
| 2,539,247 | Hensel | Jan. 23, 1951 |
| 2,691,815 | Boessenkool | Oct. 19, 1954 |
| 2,753,623 | Pflumm | July 10, 1956 |
| 2,855,660 | De Long et al. | Oct. 14, 1958 |
| 2,913,813 | Homer et al. | Nov. 24, 1959 |

OTHER REFERENCES

"Adams Lecture Solid Phase Welding," by A. B. Kinzell, presented A.W.S., Cleveland, Ohio, October 16–19, 1944, pages 3–22.

Tables from "Metal to Non Metallic Brazing," by C. S. Pearsull and P. K. Zingeser, M.I.T. Research Laboratory; Electronics Tech. Report No. 104.